(12) United States Patent
Sakai

(10) Patent No.: US 8,247,489 B2
(45) Date of Patent: Aug. 21, 2012

(54) RUBBER COMPOSITION

(75) Inventor: Tomoyuki Sakai, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 312 days.

(21) Appl. No.: 12/480,409

(22) Filed: Jun. 8, 2009

(65) Prior Publication Data

US 2009/0318585 A1 Dec. 24, 2009

(30) Foreign Application Priority Data

Jun. 23, 2008 (JP) ................................. 2008-163649

(51) Int. Cl.
*C08G 69/14* (2006.01)
*C08L 51/08* (2006.01)
*C08L 77/00* (2006.01)

(52) U.S. Cl. ............. 524/504; 524/505; 525/66; 525/90

(58) Field of Classification Search .................... 525/66, 525/90, 91; 524/504, 505
See application file for complete search history.

(56) References Cited

U.S. PATENT DOCUMENTS

| | | | |
|---|---|---|---|
| 6,401,780 B1 * | 6/2002 | Patitsas et al. ................. | 152/532 |
| 2001/0000516 A1 * | 4/2001 | Blok et al. ..................... | 524/525 |
| 2003/0125467 A1 * | 7/2003 | Akema et al. ................. | 525/208 |
| 2004/0063854 A1 * | 4/2004 | Lin et al. ........................ | 524/606 |
| 2006/0148931 A1 * | 7/2006 | Xie et al. ....................... | 523/201 |

FOREIGN PATENT DOCUMENTS

JP  H07-048476 A  2/1995

* cited by examiner

*Primary Examiner* — Jeffrey Mullis
(74) *Attorney, Agent, or Firm* — Global IP Counselors, LLP

(57) ABSTRACT

Provided is a rubber composition blended with an inorganic filler, the rubber composition having an improved dispersibility of the inorganic filler, as well as improved low heat generation property and tensile stress. The rubber composition includes a blend of: 100 parts by weight of a diene rubber; 1 to 150 parts by weight of an inorganic filler; and 0.1 to 30 parts by weight of a copolymer composed of a segment composed of a polyamide polymer and a segment composed of a diene polymer. The segment composed of the diene polymer has a number average molecular weight of not less than 10000.

15 Claims, No Drawings

RUBBER COMPOSITION

BACKGROUND OF THE INVENTION

1. Technical Field

The present invention relates to a rubber composition, and more specifically, relates to a rubber composition having an improved dispersibility of an inorganic filler, as well as improved low heat generation property and tensile stress.

2. Description of the Related Art

For some of the recent pneumatic tires, a silica is blended as a reinforcing filler with a tread rubber in place of part or all of carbon black in order to improve the fuel efficiency. Blending the silica reduces a hysteresis loss (tan δ) of a pneumatic tire, and thus reduces a rolling resistance (heat generation) of the tire. However, a poor dispersibility of the silica in a rubber causes the following problems. Specifically, it is difficult to achieve a low heat generation property even by blending the silica, and also, it is impossible to obtain a sufficient rubber strength (particularly, a tensile stress at 1000 strain) of the rubber composition when the silica is blended. Against these problems, it has been known that a sulfur-containing silane coupling agent is blended with a rubber composition in addition to the silica so as to improve the dispersibility of the silica (refer to, for example, Japanese Patent Application Kokai Publication No. Hei 7-48476).

However, since blending a sulfur-containing silane coupling agent makes a premature cure (scorching) more likely to occur, the amount of the sulfur-containing silane coupling agent to be blended is limited. This limitation makes it difficult to further improve the dispersibility of the silica. As a result, the sulfur-containing silane coupling agent has a limited ability to further improve the low heat generation property and the tensile strength of a rubber composition. While some inorganic fillers other than the silica also have poor dispersibilities in a rubber, the use of the sulfur-containing silane coupling agent has a limited effectiveness in improving the dispersibilities of such inorganic fillers.

SUMMARY OF THE INVENTION

An object of the present invention is to provide a rubber composition blended with an inorganic filler, the rubber composition having an improved dispersibility of the inorganic filler, as well as improved low heat generation property and tensile stress.

A rubber composition of the present invention for achieving the above-described object includes a blend of: 100 parts by weight of a diene rubber; 1 to 150 parts by weight of an inorganic filler; and 0.1 to 30 parts by weight of a copolymer composed of a segment composed of a polyamide polymer and a segment composed of a diene polymer. The segment composed of the diene polymer has a number average molecular weight of not less than 10000.

It is preferable that the copolymer be a graft copolymer, and also that the segment composed of the diene polymer in the copolymer is any one of polyisoprene and polybutadiene.

It is preferable that the segment composed of the polyamide polymer in the copolymer have a number average molecular weight of 300 to 10000, and that the segment composed of the polyamide polymer in the copolymer be a polymer selected from the group consisting of nylon 4, nylon 6, nylon 11, nylon 12, and a copolymer including any of monomers respectively of nylon 4, nylon 6, nylon 11, and nylon 12.

It is preferable that the inorganic filler be at least one selected from silica, clay, and calcium carbonate. The rubber composition is favorably used as a constituent material of tires.

According to the present invention, the rubber composition includes a blend of: 100 parts by weight of a diene rubber; 1 to 150 parts by weight of an inorganic filler; and 0.1 to 30 parts by weight of a copolymer composed of a segment composed of a polyamide polymer and a segment composed of a diene polymer, and the segment composed of the diene polymer has a number average molecular weight of not less than 10000. Accordingly, the copolymer has characteristics that the segment composed of the polyamide polymer has a high affinity for the inorganic filler and that the segment composed of the diene polymer is likely to be crosslinked with, and has a high affinity for, the diene rubber. For this reason, with the copolymer having such properties serving as a medium, the dispersibility of the inorganic filler in the diene rubber is significantly improved. Consequently, when silica is used as the inorganic filler, it is possible to improve the low heat generation property and the tensile stress of the rubber composition by improving the dispersibility of the silica.

DESCRIPTION OF THE PREFERRED EMBODIMENT

In a rubber composition of the present invention, a diene rubber is used as a rubber component. The diene rubber to be used is not particularly limited, and may be any of those typically used in rubber compositions. Examples of such a diene rubber include natural rubber, isoprene rubber, butadiene rubber, styrene-butadiene rubber, acrylonitrile-butadiene rubber, and butyl rubber. The diene rubber preferably used is natural rubber, butadiene rubber, or styrene-butadiene rubber. These diene rubbers may be used alone or in any blend thereof.

Examples of an inorganic filler to be blended with the rubber composition of the present invention include those having poor dispersibilities in a diene rubber, such as silica, clay, calcium carbonate, and also include zinc oxide, talc, mica, magnesium hydroxide, and aluminum hydroxide. Among these, silica, clay, and calcium carbonate are preferable. These inorganic fillers may be used alone or in combination of two or more of them.

The silica preferably used in the present invention is not particularly limited as long as it is one normally used in rubber compositions. Examples of the silica include fumed silica, pyrogenic silica, precipitated silica, crushed silica, fused silica, finely-divided silicic anhydride and finely-divided silicic acid. On the other hand, the clay has an effect of enhancing the strength and wear resistance of rubber compositions, and kaolin clay, calcined clay, pyrophyllite clay, synthetic hydrated aluminum silicate, or the like may be used as the clay, for example.

The amount of the inorganic filler to be blended may be 1 to 150 parts by weight, and preferably be 10 to 100 parts by weight, with respect to 100 parts by weight of the diene rubber. If the amount of the inorganic filler to be blended is less than 1 part by weight, it is impossible to obtain a sufficient effect of reinforcing the rubber composition. In addition, the amount of the silica to be blended is less than 1 part by weight, it is impossible to reduce the hysteresis loss (tan δ). On the other hand, if the amount of the inorganic filler to be blended exceeds 150 parts by weight, the dispersibility of the inorganic filler is deteriorated and the viscosity of the rubber composition is increased, so that the processability of the rubber composition is deteriorated.

In the rubber composition of the present invention, a copolymer that is composed of a segment composed of a polyamide polymer (hereinafter, sometimes referred to simply as the polyamide polymer segment) and a segment composed of a diene polymer (hereinafter, sometimes referred to simply as the diene polymer segment) gives the effect of improving the dispersibility of the inorganic filler in the diene rubber. Specifically, the polyamide polymer segment in the copolymer has a high affinity for the inorganic filler while the diene polymer segment has such properties as to have the effect of crosslinking with, and thus a high affinity for, the diene rubber. Accordingly, the copolymer serving as a medium significantly improves the dispersibility of the inorganic filler in the diene rubber. More specifically, the diene polymer segment in the copolymer is crosslinked with the diene rubber in the curing process, so that the bonding of the copolymer with the diene rubber is strengthened. As a result, the effect of coupling the diene rubber and the inorganic filler is further increased.

Conventionally, sulfur-containing silane coupling agents have been widely used as dispersants for the inorganic filler. If the copolymer composed of the polyamide polymer segment and the diene polymer segment is used instead, the dispersibility of the inorganic filler is increased to a greater extent than the case where such a sulfur-containing silane coupling agent is blended. In addition, the copolymer contains no sulfur, unlike the sulfur-containing silane coupling agents. For this reason, even if the amount of the copolymer to be blended is increased, premature cure (scorching) does not occur during the mixing of the rubber composition.

The amount of the copolymer to be blended, which contains the polyamide polymer segment and the diene polymer segment, may be 0.1 to 30 parts by weight, preferably 0.5 to 10 parts by weight, and more preferably 1 to 8 parts by weight, with respect to 100 parts by weight of the diene rubber. If the amount of the copolymer to be blended is less than 0.1 parts by weight, the effect of improving the dispersibility of the inorganic filler in the rubber composition cannot be obtained. On the other hand, if the amount of the copolymer to be blended exceeds 30 parts by weight, the effect is saturated. Blending more excessive amount of the copolymer reduces the mechanical strength of the rubber composition, and is also economically disadvantageous.

The copolymer to be used in the rubber composition of the present invention may be any type of a block copolymer, a random block copolymer, and a graft copolymer as long as the copolymer contains the polyamide polymer segment and the diene polymer segment. The graft copolymer of the polyamide polymer segment and the diene polymer segment is easily synthesized, and is thus preferable.

The segment composed of diene polymer constituting the copolymer is a segment obtained by polymerizing a monomer of a diene compound, such as butadiene, isoprene, pentadiene, or hexadiene. The diene polymer segment may be a homopolymer of a diene compound, or a copolymer of diene compounds, or may alternatively be a copolymer of a diene compound and any one of ethylene and α-olefin having 3 to 10 carbon atoms. Among such polymers as described above, polybutadiene and polyisoprene are preferable for the diene polymer segment.

In addition, in the copolymer to be used in the present invention, the segment composed of diene polymer has a number average molecular weight of not less than 10000, and preferably 10000 to 200000. If the number average molecular weight of the diene polymer segment is less than 10000, a sufficient crosslinkability with the diene rubber cannot be obtained, so that the affinity between the copolymer and the diene rubber becomes insufficient. On the other hand, the upper limit of the number average molecular weight of the diene polymer segment is preferably set at 200000 or less from the viewpoint of the affinity for the inorganic filler and the processing viscosity. Note that the number average molecular weight of the diene polymer segment is measured by gel permeation chromatography (GPC) calibrated with polystyrene.

The polyamide polymer segment constituting the copolymer to be used in the rubber composition of the present invention is a segment obtained by polymerizing: an aminocarboxylic acid compound; a lactam compound; or a diamine and a dicarboxylic acid. The aminocarboxylic acid compound preferably is an aliphatic ω-aminocarboxylic acid having 5 to 20 carbon atoms, examples of which include 6-aminocaproic acid, 7-aminoheptanoic acid, 8-aminooctanoic acid, 10-aminocapric acid, 11-aminoundecanoic acid, and 12-aminododecanoic acid. The lactam compound preferably is an aliphatic lactam having 4 to 15 carbon atoms, examples of which include γ-butyrolactam, ε-caprolactam, ζ-enantholactam, ω-undecalactam, and ω-dodecalactam.

In the polyamide polymer segment obtained by polymerizing a diamine and a dicarboxylic acid, the diamine preferably is an aliphatic, alicyclic, or aromatic diamine having 2 to 20 carbon atoms, examples of which include: aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, 1,4-cyclohexyldiamine, 1,3-cyclohexyldiamine, tridecanediamine, tetradecanediamine, pentadecanediamine, hexadecanediamine, heptadecanediamine, octadecanediamine, nonadecanediamine, eicosanediamine, and 2-methyl-1,8-octanediamine; alicyclic diamines such as 1,3/1,4-cyclohexyldiamine, bis(4-aminocyclohexyl)methane, bis(4-aminocyclohexyl)propane, bis(3-methyl-4-aminocyclohexyl)methane, bis(3-methyl-4-aminocyclohexyl)propane, 1,3/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, and norbornane dimethyleneamine; aromatic diamines such as p-xylylenediamine and m-xylylenediamine.

The dicarboxylic acid preferably is an aliphatic, alicyclic, or aromatic dicarboxylic acid, having 2 to 20 carbon atoms, examples of which include: aliphatic dicarboxylic acids such as oxalic acid, succinic acid, glutaric acid, adipic acid, pimelic acid, suberic acid, azelaic acid, sebacic acid, and dodecanedioic acid; alicyclic dicarboxylic acids such as 1,3/1,4-cyclohexanedicarboxylic acid, dicyclohexanemethane-4,4'-dicarboxylic acid, and norbornanedicarboxylic acid; and aromatic dicarboxylic acids such as terephthalic acid and isophthalic acid.

The polyamide polymer segment may be a homopolymer of one of the above-described kinds of monomers, or may be a copolymer of two or more different kinds of monomers. Examples of the polyamide polymer segment include, for example: polymers such as polycaproamide (nylon 6), polyaminoundecanoic acid (nylon 11), polylauryllactam (nylon 12), poly-α-pyrrolidone (nylon 4), polyhexamethylenediaminoadipic acid (nylon 66), polyhexamethylenediaminosebacic acid (nylon 610), polyhexamethylenediaminododecane diacid (nylon 612);

copolymers such as caprolactam/lauryllactam copolymer (nylon 6/12), caprolactam/aminoundecanoic acid copolymer (nylon 6/11), caprolactam/hexamethylenediaminoadipic acid copolymer (nylon 6/66), caprolactam/hexamethylenediaminoadipic acid/aminododecane diacid copolymer (nylon 6/66/12), caprolactam/hexamethylenediaminoadipic acid/lauryllactam copolymer (nylon 6/66/12), caprolactam/hexamethylenediaminoadipic acid/hexamethylenediaminosebacic acid copolymer (nylon 6/66/610), caprolactam/hexamethylenediaminoadipic acid/hexamethylenediaminododecane diacid copolymer (nylon 6/66/612), caprolactam/hexamethylenetelephthalic acid copolymer (6/6T); and the like. Among these, the polyamide polymer segment preferably is nylon 4, nylon 6, nylon 11, or nylon 12. It is also preferable to use a nylon copolymer containing a monomer constituting any of these nylons.

The number average molecular weight of the polyamide polymer segment is set preferably at 300 to 10000, and more preferably at 300 to 5000. If the number average molecular weight of the polyamide polymer segment is less than 300, a sufficient affinity for the inorganic filler cannot be obtained. On the other hand, the number average molecular weight of the polyamide polymer segment exceeds 10000, the segment becomes so rigid that a sufficient affinity for the inorganic filler cannot be obtained in this case as well. Note that the number average molecular weight of the polyamide polymer segment is measured by gel permeation chromatography (GPC) calibrated with polystyrene The method for manufacturing the copolymer to be used in the rubber composition of the present invention is not particularly limited, and any generally-employed method of polymerization may be employed. For example, the following methods may be employed: (1) an aminocarboxylic acid compound or a lactam compound is polymerized in the presence of a diene polymer having at least one carboxylic or amino group in the molecule, so that the polyamide polymer segment is directly combined with the diene polymer segment; (2) a diamine and a dicarboxylic acid are polymerized in the presence of a diene polymer having at least one carboxylic or amino group in the molecule, so that the polyamide polymer segment is directly combined with the diene polymer segment; (3) a diene polymer is first caused to react with an acid anhydride, and thereafter, a diamine and a dicarboxylic acid are polymerized, or a lactam compound or a aminocarboxylic acid is polymerized; and (4) a polyamide is first synthesized by a generally-employed method of manufacturing a polyamide in a state where at least one of the diamine and the dicarboxylic acid includes a small amount of another diamine or another dicarboxylic acid having a radical-polymerizable functional group such as a double bond, and thereafter, a diene monomer is added for polymerization.

Among these manufacturing method, preferable is the method (1) in which a lactam compound is polymerized in the presence of a diene polymer having a carboxylic group, so that the polyamide polymer segment is directly combined with the diene polymer segment because of its easiness of synthesis and easiness of adjustment of molecular weights. As such a lactam compound, γ-butyrolactam, ε-caprolactam, ω-undecalactam, or ω-dodecalactam is particularly preferable.

In the above-described manufacture of the copolymer to be used in the present invention, a diene polymer having at least one carboxylic group in the molecule is preferably used. Such a diene polymer having at least one carboxylic group in the molecule is commercially available, and accordingly, can be easily obtained. Alternatively, a diene polymer having at least one carboxylic group in the molecule can be manufactured by a generally-known method of polymerization. Examples of such a diene polymer having at least one carboxylic group in the molecule include a carboxylic group-containing polybutadiene (OC 800 S manufactured by Degussa Corporation) and a carboxylic group-containing polyisoprene (LIR-410 manufactured by Kuraray Co., Ltd.).

The rubber composition of the present invention may be blended with various kinds of additives normally used in rubber compositions, such as a curing or crosslinking agent, a curing accelerator, an antioxidant, a plasticizer, a coupling agent, and the like. Such an additive may be kneaded with the rubber composition by a general method, thereby being used for a curing or crosslinking process. The amount of each of these additives to be blended may be set at a blending amount that has conventionally been employed in general unless the amount to be blended does not meet the object of the present invention. The rubber composition can be manufactured by mixing the above-described components by using a known rubber mixing machine, for example, a Banbury mixer, a kneader, a roll, or the like.

As described so far in detail, the rubber composition of the present invention has the dispersibility of the inorganic filler improved by blending the copolymer including the polyamide polymer segment and the diene polymer segment in place of a sulfur-containing silane coupling agent. Improving the dispersibility of silica in particular reduces tan δ of the rubber composition to provide the rubber composition with a low heat generation property, and also improves the tensile stress of the rubber composition. Accordingly, using the rubber composition of the present invention in a pneumatic tire makes it possible to improve the fuel efficiency, the durability, or the performance of the pneumatic tire.

The rubber composition of the present invention is favorably used as a constituent material of tires, and is favorably used for forming, for example, a cap tread portion, an undertread portion, a sidewall portion, a bead filler portion, and a rim cushion portion, of a pneumatic tire. A pneumatic tire including at least one of such components is excellent in fuel efficiency, durability, or performance.

Hereinafter, the present invention will be further described by giving examples; however, the scope of the present invention is not limited to these examples.

EXAMPLE

Preparation of Copolymer

Copolymer 1

Carboxylic acid-modified polyisoprene (which is LIR-410 manufactured by Kuraray Co., Ltd, and has a number average molecular weight of 25000) and ε-caprolactam were introduced into an autoclave in a weight ratio of 2:1, and subjected to polymerization reaction for 10 minutes at 250° C. After that, unreacted ε-caprolactam was removed by washing with acetone added to the resultant product of the polymerization reaction, followed by drying. As a result, Copolymer 1 was obtained.

When Copolymer 1 thus obtained was analyzed by infrared absorption spectroscopy, the C=O stretching vibration at 1715 cm$^{-1}$ in the carboxylic acid disappeared, while the C=O stretching vibration at 1659 cm$^{-1}$ and the N—H stretching vibration at 3299 cm$^{-1}$ in the amide bond appeared. In addition, when the molecular weight of the polyamide block was measured by using H-NMR, the number average molecular weight thereof was approximately 600 (pentamer). Copolymer 1 is a copolymer obtained by grafting a segment composed of nylon 6 onto a polyisoprene segment having a number average molecular weight of 25000.

Copolymer 2

Copolymer 2 was obtained in the same method as that for manufacturing Copolymer 1 described above except that the weight ratio of the carboxylic acid-modified polyisoprene and ε-caprolactam was set at 1:1.

When Copolymer 2 thus obtained was analyzed by infrared absorption spectroscopy, the C=O stretching vibration at 1715 cm$^{-1}$ in the carboxylic acid disappeared, while the C=O stretching vibration at 1659 cm$^{-1}$ and the N—H stretching vibration at 3299 cm$^{-1}$ in the amide bond appeared. In addition, when the molecular weight of the polyamide block was measured by using H-NMR, the number average molecular weight thereof was approximately 900 (octamer). Copolymer 2 is a copolymer obtained by grafting a segment composed of nylon 6 onto a polyisoprene segment having a number average molecular weight of 25000.

Copolymer 3

Carboxylic acid-modified polybutadiene (which is OS 800 S manufactured by Degussa Corporation, and has a number average molecular weight of 2000) and ε-caprolactam were introduced into an autoclave in a weight ratio of 2:1 together with methanol, and subjected to polymerization reaction for 10 minutes at 250° C. After that, unreacted ε-caprolactam was removed by washing with acetone added to the resultant product of the polymerization reaction, followed by drying. As a result, Copolymer 3 was obtained.

When Copolymer 3 thus obtained was analyzed by infrared absorption spectroscopy, the C=O stretching vibration at 1715 cm$^{-1}$ in the carboxylic acid disappeared, while the C=O stretching vibration at 1659 cm$^{-1}$ and the N—H stretching vibration at 3299 cm$^{-1}$ in the amide bond appeared. In addition, when the molecular weight of the polyamide block was measured by using H-NMR, the number average molecular weight thereof was approximately 700 (hexamer). Copolymer 3 is a copolymer obtained by grafting a segment composed of nylon 6 onto a polybutadiene segment having a number average molecular weight of 2000.

Preparation of Rubber Compositions

Fifteen types of rubber compositions (Examples 1 to 8 and Comparative Examples 1 to 7) were prepared as follows in accordance with corresponding proportions of ingredients shown in Tables 1 to 3. For each of the rubber compositions, the ingredients to be blended, except for sulfur and a curing accelerator, were weighed and kneaded for 5 minutes at 145° C. in a Banbury mixer having a capacity of 1.7 L so as to obtain a masterbatch. The masterbatch thus obtained was discharged from the Banbury mixer and cooled down to room temperature. The masterbatch was then introduced into the Banbury mixer having a capacity of 1.7 L, and mixed for 3 minutes at 90° C. with sulfur and the curing accelerator added thereto, so that the rubber composition was prepared.

Each of the fifteen types of rubber compositions (Examples 1 to 8 and Comparative Examples 1 to 7) was cured for 20 minutes at 160° C. in a mold having a predetermined shape, so that a test piece (a cured rubber sheet: 147 mm×147 mm×2 mm) was prepared. By the following methods, the dispersibility of the inorganic filler, the tensile stress, and the tan δ, of each rubber composition, were measured by using the corresponding test piece.

Tensile Stress

The tensile stresses at 100% strain of the test pieces thus obtained were measured according to JIS K6251. Specifically, each of the test pieces was formed into a No. 3 dumbbell-shaped test piece, and the tensile stress at 100% strain thereof was measured at a temperature of 230° C. at a tensile speed of 500 mm/min. The results of the measurement are shown in Tables 1 to 3.

Tan δ

In terms of the dynamic viscoelasticity of each of the obtained test pieces, the tan δ of each test piece at a temperature of 60° C. was measured under the conditions of an initial strain of 10%, an amplitude of ±2%, and a frequency of 20 Hz by using a viscoelasticity spectrometer manufactured by Toyo Seiki Seisaku-sho, Ltd. The results of the measurement are shown in Tables 1 to 3. The smaller the tan δ at a temperature of 60° C. is, the more excellent the rubber composition is in low heat generation property.

Dispersibility of Inorganic Filler

The dispersibility of the inorganic filler of each of the obtained test pieces was evaluated according to ISO 11345. Specifically, the cross section of each of the obtained test pieces was subjected to image analysis using a carbon black dispersion tester (manufactured by Optigrade, Sweden), and thus, the dispersibility was rated on the 10-point scale based on the following equation.

Rating=10−9×(the area of a region occupied by undispersed lumps of not less than 23 μm in an image)/[0.19×(the total area of the image)]

TABLE 1

|  |  | Example 1 | Example 2 | Comparative Example 1 | Comparative Example 2 | Comparative Example 3 | Comparative Example 4 |
|---|---|---|---|---|---|---|---|
| SBR | (Parts by Weight) | 100 | 100 | 100 | 100 | 100 | 100 |
| Silica | (Parts by Weight) | 40 | 40 | 40 | 40 | 40 | 40 |
| Copolymer 1 | (Parts by Weight) | 3 |  |  |  |  |  |
| Copolymer 2 | (Parts by Weight) |  | 3 |  |  |  |  |
| Copolymer 3 | (Parts by Weight) |  |  |  |  |  | 3 |
| Coupling Agent | (Parts by Weight) |  |  |  | 3 |  |  |
| Acid-modified IR | (Parts by Weight) |  |  |  |  | 3 |  |
| Zinc White | (Parts by Weight) | 3 | 3 | 3 | 3 | 3 | 3 |
| Stearic Acid | (Parts by Weight) | 1 | 1 | 1 | 1 | 1 | 1 |
| Antioxidant | (Parts by Weight) | 1 | 1 | 1 | 1 | 1 | 1 |
| Sulfur | (Parts by Weight) | 1.5 | 1.5 | 1.5 | 1.5 | 1.5 | 1.5 |
| Curing Accelerator 1 | (Parts by Weight) | 1.5 | 1.5 | 1.5 | 1.5 | 1.5 | 1.5 |
| Curing Accelerator 2 | (Parts by Weight) | 0.5 | 0.5 | 0.5 | 0.5 | 0.5 | 0.5 |
| Tensile Stress at 100% strain | (MPa) | 3.7 | 3.8 | 3.5 | 1.7 | 2.4 | 2 |
| tan δ (60° C.) |  | — | 0.124 | 0.120 | 0.126 | 0.140 | 0.131 | 0.134 |
| Dispersibility | (Rating) | 10 | 10 | 8 | 4 | 5 | 4 |

TABLE 2

| | | Example 3 | Example 4 | Comparative Example 5 | Example 5 | Example 6 | Comparative Example 6 |
|---|---|---|---|---|---|---|---|
| NR | (Parts by Weight) | 100 | 100 | 100 | | | |
| BR | (Parts by Weight) | | | | 100 | 100 | 100 |
| Silica | (Parts by Weight) | 60 | 60 | 60 | 40 | 40 | 40 |
| Copolymer 1 | (Parts by Weight) | 3 | | | 3 | | |
| Copolymer 2 | (Parts by Weight) | | 3 | | | 3 | |
| Coupling Agent | (Parts by Weight) | | | 3 | | | 3 |
| Zinc White | (Parts by Weight) | 3 | 3 | 3 | 3 | 3 | 3 |
| Stearic Acid | (Parts by Weight) | 1 | 1 | 1 | 1 | 1 | 1 |
| Antioxidant | (Parts by Weight) | 1 | 1 | 1 | 1 | 1 | 1 |
| Sulfur | (Parts by Weight) | 1.5 | 1.5 | 1.5 | 1.5 | 1.5 | 1.5 |
| Curing Accelerator 1 | (Parts by Weight) | 1.5 | 1.5 | 1.5 | 1.5 | 1.5 | 1.5 |
| Curing Accelerator 2 | (Parts by Weight) | 0.5 | 0.5 | 0.5 | 0.5 | 0.5 | 0.5 |
| Tensile Stress at 100% strain | (MPa) | 4.1 | 4.2 | 4.0 | 3.2 | 3.3 | 2.9 |
| tan δ (60° C.) | | — | 0.128 | 0.130 | 0.141 | 0.100 | 0.099 | 0.109 |
| Dispersibility | (Rating) | 10 | 10 | 7 | 10 | 10 | 8 |

TABLE 3

| | | Example 7 | Example 8 | Comparative Example 7 |
|---|---|---|---|---|
| SBR | (Parts by Weight) | 100 | 100 | 100 |
| Clay | (Parts by Weight) | 40 | 40 | 40 |
| Copolymer 1 | (Parts by Weight) | 3 | | |
| Copolymer 2 | (Parts by Weight) | | 3 | |
| Coupling Agent | (Parts by Weight) | | | 3 |
| Zinc White | (Parts by Weight) | 3 | 3 | 3 |
| Stearic Acid | (Parts by Weight) | 1 | 1 | 1 |
| Antioxidant | (Parts by Weight) | 1 | 1 | 1 |
| Sulfur | (Parts by Weight) | 1.5 | 1.5 | 1.5 |
| Curing Accelerator 1 | (Parts by Weight) | 1.5 | 1.5 | 1.5 |
| Curing Accelerator 2 | (Parts by Weight) | 0.5 | 0.5 | 0.5 |
| Tensile Stress at 100% strain | (MPa) | 3.7 | 3.8 | 2 |
| tan δ (60° C.) | | 0.124 | 0.120 | 0.134 |
| Dispersibility | (Rating) | 10 | 10 | 7 |

Note that the kinds of raw materials used in Tables 1 to 3 are listed below.
SBR: Styrene Butadiene Rubber, Nipol 1502 manufactured by Zeon Corporation
NR: Natural Rubber, SIR 20 manufactured by PT. NUSIRA
BR: Butadiene Rubber, Nipol BR1220 manufactured by Zeon Corporation
Silica: ZEOSIL 165GR manufactured by Rhodia
Clay: Dry Clay, No. 5 Clay manufactured by Takehara Chemical Industrial Co., Ltd.
Coupling Agent: Bis [3-(triethoxysilyl)-propyl] tetrasulfide, Si69 manufactured by Degussa Corporation
Acid-modified IR: Carboxylic acid-modified polyisoprene, LIR-410 manufactured by Kuraray Co., Ltd., Number Average Molecular Weight of 25000
Zinc white: Zinc Oxide No. 3 manufactured by Seido Chemical Industry Co., Ltd.
Stearic Acid: Bead Stearic Acid YR manufactured by NOR Corporation
Antioxidant: SANTOFLEX 6PPD manufactured by Flexsys
Sulfur: 5% Oil-treated Sulfur manufactured by Karuizawa Seirensho
Curing Accelerator 1: NOCCELER CZ-G manufactured by Ouch Sinko Chemical Industrial Co., Ltd.
Curing Accelerator 2: SOXINOL D-G manufactured by Sumitomo Chemical Co., Ltd.

What is claimed is:

1. A rubber composition comprising a blend of:
   100 parts by weight of a diene rubber;
   1 to 150 parts by weight of an inorganic filler; and
   0.1 to 30 parts by weight of a copolymer composed of a segment composed of a polyamide polymer and a segment composed of a diene polymer,
   wherein
      the segment composed of the diene polymer has a number average molecular weight of not less than 10000,
      the segment composed of the polyamide polymer in the copolymer has a number average molecular weight of 300 to 2000,
      the inorganic filler is selected from at least one of silica, clay, and calcium carbonate, and
      the rubber composition does not contain a sulfur-containing silane coupling agent.

2. The rubber composition according to claim 1, wherein the copolymer is a graft copolymer.

3. The rubber composition according to claim 1, wherein the segment composed of the diene polymer in the copolymer is any one of polyisoprene and polybutadiene.

4. The rubber composition according to claim 2, wherein the segment composed of the diene polymer in the copolymer is any one of polyisoprene and polybutadiene.

5. The rubber composition according to claim 1, wherein the segment composed of the polyamide polymer in the copolymer has a number average molecular weight of 300 to 1000.

6. The rubber composition according to claim 1, wherein the segment composed of the polyamide polymer in the copolymer is a polymer selected from the group consisting of nylon 4, nylon 6, nylon 11, nylon 12, and a copolymer including any of monomers respectively of nylon 4, nylon 6, nylon 11 and nylon 12.

7. The rubber composition according to claim 2, wherein the segment composed of the polyamide polymer in the copolymer is a polymer selected from the group consisting of nylon 4, nylon 6, nylon 11, nylon 12, and a copolymer including any of monomers respectively of nylon 4, nylon 6, nylon 11 and nylon 12.

8. The rubber composition according to claim 4, wherein the segment composed of the polyamide polymer in the copolymer is a polymer selected from the group consisting of nylon 4, nylon 6, nylon 11, nylon 12, and a copolymer including any of monomers respectively of nylon 4, nylon 6, nylon 11 and nylon 12.

9. The rubber composition according to claim 1, wherein the rubber composition is a constituent material of tires.

10. The rubber composition according to claim 2, wherein the rubber composition is a constituent material of tires.

11. The rubber composition according to claim 4, wherein the rubber composition is a constituent material of tires.

12. The rubber composition according to claim 7, wherein the rubber composition is a constituent material of tires.

13. The rubber composition according to claim 8, wherein the rubber composition is a constituent material of tires.

14. The rubber composition according to claim 1, wherein the rubber composition is a constituent material of tires.

15. The rubber composition according to claim 1, wherein the rubber composition is a constituent material of tires.

* * * * *